May 16, 1939. O. W. PURDUM 2,158,947
TROT LINE JIG
Filed April 14, 1937
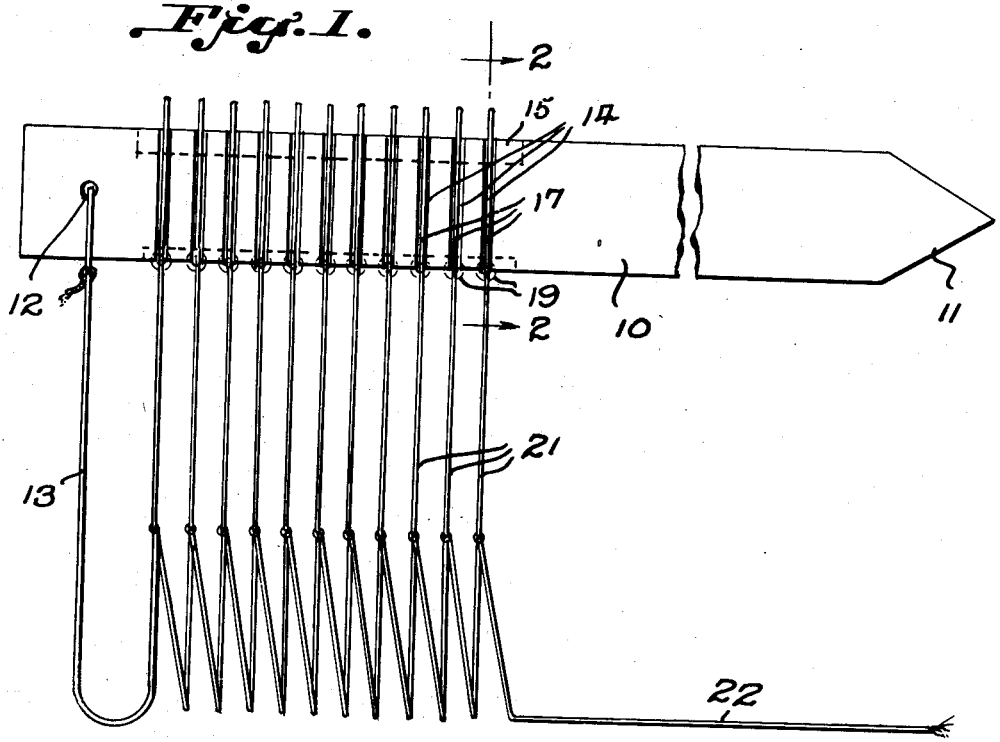
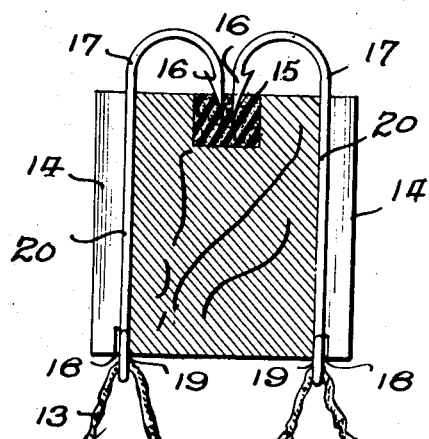
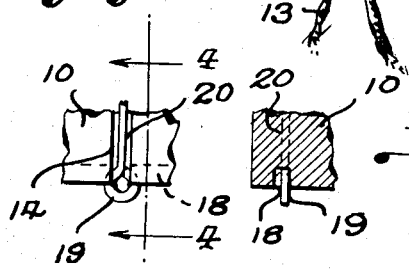
Inventor
O. W. PERDUM
By Felix A. Russell
Attorney Patented May 16, 1939

2,158,947

UNITED STATES PATENT OFFICE 2,158,947

TROT LINE JIG

Oscar William Purdum, Atchison, Kans.

Application April 14, 1937, Serial No. 136,906

2 Claims. (Cl. 43—31)

This invention relates to a carrier for trot lines and it is an object of the invention to provide a device of this kind which may be easily assembled, transported and used without danger of entangling the lines.

A further object of the invention is the provision of a device of this kind which may be carried from place to place without danger to the operator thereof.

A further object of the invention is the provision of novel means for protecting the barbs or hooks from coming into contact with the operator.

A further object of the invention is the provision of a device of this kind which may also be utilized as a stake whereby one end of the trot line may be anchored.

Other and further objects of the invention will become apparent from a reading of the following specification taken in conjunction with the appended claims.

For a better understanding of the invention, reference may now be had to the accompanying drawing, wherein:

Figure 1 is a side elevational view of a jig constructed in accordance with this invention, Figure 2 is an enlarged sectional view taken along line 2—2 of Figure 1, Figure 3 is an enlarged fragmentary view of a detail of construction of the jig, and Figure 4 is a sectional view taken substantially along line 4—4 of Figure 3.

Referring more particularly to the drawing, there is shown therein a trot line holder generally designated at 10 and of preferably square construction in section as indicated in Figure 2. The holder is pointed as shown at 11 and the opposite end is provided with an opening 12 for the reception of one end of a trot line 13. Formed in each of two opposed sides of the holder 10 at points near the opening 12 is a series of transverse grooves 14 for the reception of shanks 20 of hooks 17.

Embedded in one side of the holder 10 in a longitudinal direction is a piece of porous material 15, preferably of sponge rubber, within which barbs 16 of fish hooks 17 are adapted to be inserted in such manner that the hooks are aligned in opposed pairs, the shanks lying in grooves 14 as above set forth. A pair of elongated grooves 18 is provided for the reception of the eyes 19 of the fish hooks.

It will be seen that the shanks 20 of the hooks are thus kept from coming into contact with the body of the person employing the device. It will further be seen that the trot line 13 is provided with the usual dependent lines 21 for the reception of the hooks 17.

In operation, it will be seen that the end 22 may be fastened to any fixed object, for example a tree or post and the trot line then carried across the stream, the hooks being removed singly from right to left as viewed in Figure 1 and the point 11 of the holder 10 may be driven into the earth in the bed or side of the stream.

While but one form of the invention has been described herein, it will nevertheless be apparent to those skilled in the art that various minor modifications may be made of the same without departing from the spirit of the invention or the scope of the appended claims.

What is claimed is:

1. A trot line jig comprising an elongated body provided with a point at one end, means for fastening a trot line at the other end of the body a plurality of grooves upon opposite sides of the body for the reception of the shanks of a series of fish hooks, and a longitudinally extending insert of sponge rubber in the body for the reception of the barbs of the hooks.

2. A trot line jig comprising an elongated body having a longitudinally insert of sponge rubber for the reception of the barbs of a series of fish hooks and having means for the reception of the shanks and eyes of said hooks.

OSCAR WILLIAM PURDUM.